(12) United States Patent
Patel et al.

(10) Patent No.: US 11,909,664 B2
(45) Date of Patent: *Feb. 20, 2024

(54) SID ALLOCATION

(71) Applicant: Arrcus Inc., San Jose, CA (US)

(72) Inventors: Keyur Patel, San Jose, CA (US);
Kalyani Rajaraman, San Jose, CA (US); Ravindra Vaishampayan, Fremont, CA (US); Derek Man-Kit Yeung, Fremont, CA (US); Lalit Kumar, Milpitas, CA (US); Tetsuya Murakami, Sunnyvale, CA (US); Matthew Anderson, Falls Church, VA (US)

(73) Assignee: Arrcus Inc., San Jose, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/569,286

(22) Filed: Jan. 5, 2022

(65) Prior Publication Data

US 2022/0131812 A1 Apr. 28, 2022

Related U.S. Application Data

(63) Continuation of application No. 16/783,931, filed on Feb. 6, 2020, now Pat. No. 11,252,101.

(51) Int. Cl.
| | |
|---|---|
| *G06F 15/16* | (2006.01) |
| *H04L 47/78* | (2022.01) |
| *H04L 41/0604* | (2022.01) |
| *H04L 41/0654* | (2022.01) |
| *H04L 47/74* | (2022.01) |
| *H04L 101/659* | (2022.01) |

(52) U.S. Cl.
CPC ........ *H04L 47/781* (2013.01); *H04L 41/0627* (2013.01); *H04L 41/0654* (2013.01); *H04L 47/746* (2013.01); *H04L 2101/659* (2022.05)

(58) Field of Classification Search
CPC .......... H04L 2101/659; H04L 41/0654; H04L 41/0627; H04L 47/781
USPC ....................................................... 709/206
See application file for complete search history.

(56) References Cited

U.S. PATENT DOCUMENTS

| | | | |
|---|---|---|---|
| 2017/0054626 A1* | 2/2017 | Sivabalan | ............... H04L 45/64 |
| 2019/0036818 A1* | 1/2019 | Nainar | .................... H04L 45/34 |

* cited by examiner

*Primary Examiner* — Lan Dai T Truong
(74) *Attorney, Agent, or Firm* — David R. Stevens; Stevens Law Group (57) ABSTRACT

A segment identifier (SID) manager interfaces with clients by way of a library. Clients implementing network services and needing SIDs according to internet SRv6, are allocated blocks by the SID manager using the library. Clients assign SIDs from the block independent of the SID manager using the library. Where a threshold portion of the block is assigned, the library requests an additional block of SIDs from the SID manager. Clients transmit context mappings of assigned SIDs to the SID manager for use by administrators and to enable recovery in the event of failure.

18 Claims, 5 Drawing Sheets

SID ALLOCATION

RELATED APPLICATION

This application is a continuation of U.S. patent application Ser. No. 16/783,931, filed Feb. 6, 2020, which is hereby incorporated by reference in its entirety.

BACKGROUND

Segment Routing over IPv6 dataplane (SRv6) defines the segment routing over Internet Protocol version 6 (IPv6) protocol for routing segments over a dataplane, such as dataplane of a router or other network device with many connected routers, switches, or other networking components, server computers, or other computing devices. According to SRv6, routing of a packet is encoded in a packet by means of a segment identifier (SID) defining routing of the packet through the data plane.

This application relates to an improved approach for allocating SIDs in a system including an IPv6 dataplane.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
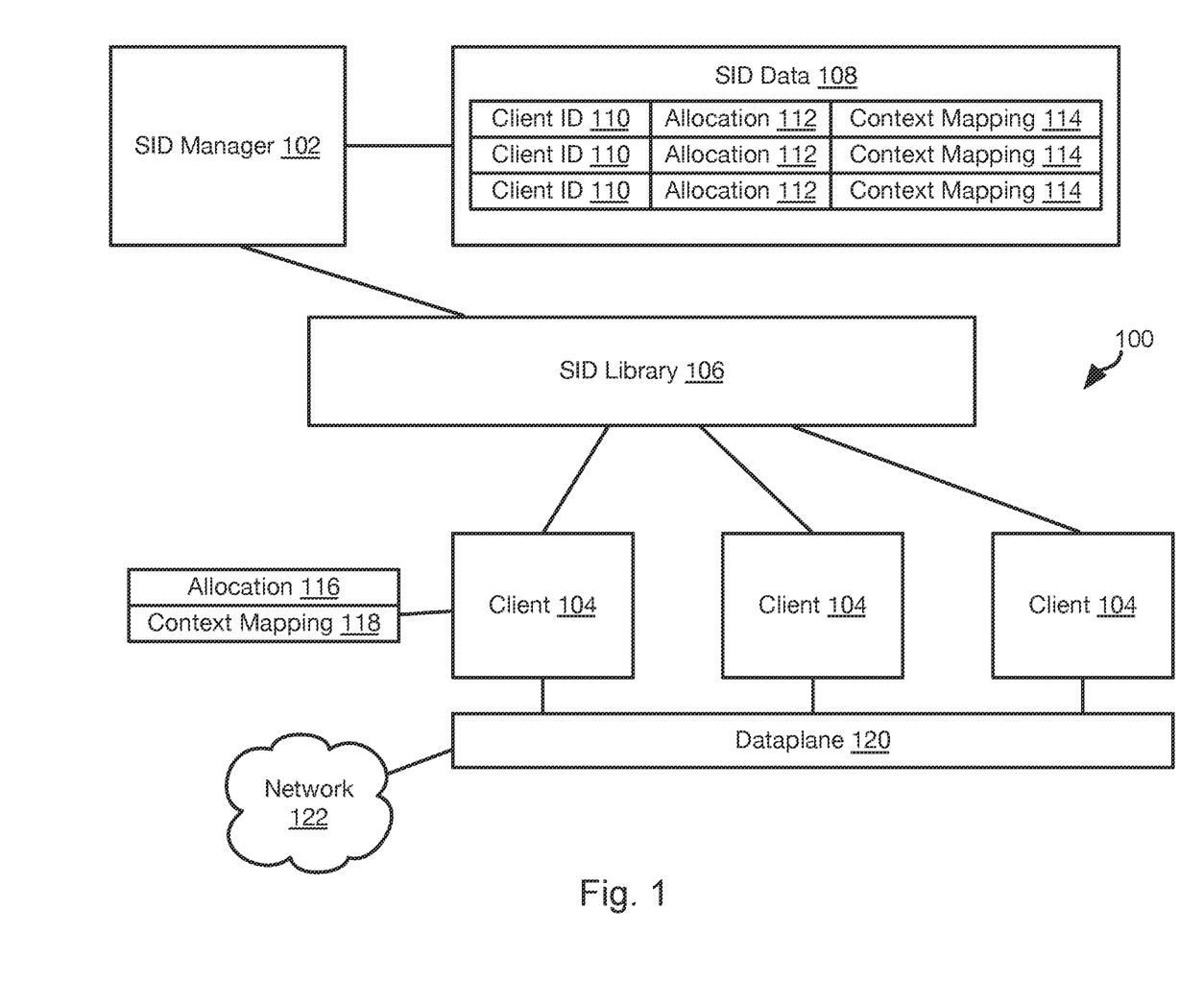
FIG. 1 is schematic block diagram of components for implementing low-latency SID allocation in accordance with an embodiment of the present invention.

FIG. 1, illustrates an example architecture of an architecture 100 for allocating segment identifiers (SIDs). The illustrated components may represent executable components on an individual computer system. The computing system may be embodied as a single computing device, a server rack with multiple servers mounted to a common backplane, or other type of computing device.

The architecture 100 may include an SID Manager 102. The SID manager 102 assigns SIDs to clients 104 executing on the computer system. The SID manager 102 assigns the SIDs such that each SID is globally unique among all the clients 104. As discussed in greater detail below, the SIDs may be assigned in blocks, e.g. 1000 to 2000 SIDs at a time, such that latency at the clients 104 is reduced and loading of the SID manager 102 is likewise reduced.

Each client 104 may implement a network protocol or a part of a network protocol such as intermediate system to intermediate system (IS-IS) protocol; open shortest path first (OSPF) protocol; border gateway protocol (BGP); or static routing. The clients 104 may implement Segment Routing over IPv6 (SRv6) and may use the SIDs received from the SID manager 102 in accordance with that protocol. In particular, each SID assigned to a client 104 may be associated by that client 104 with a forwarding behavior, i.e. a packet labeled with that SID will be routed by that client 104 to another client 104, an external address, or some other component or computing device according to the forwarding behavior associated with that SID. This association of forwarding behavior with a SID is referred to herein as context mapping.

The clients 104 may interface with the SID manager 102 by way of a SID library 106. The clients 104 may link to the library 106 in any manner known in the art. For example, the library may be a dynamic link library (DLL) such as are used in MICROSOFT WINDOWS operating systems and the clients 104 may load this library on instantiation thereby providing the clients 104 with functions for accessing the SID manager 102 according to the methods disclosed herein. The SID library 106 may be a library of functions as defined in a UNIX, LINUX, or other operating system. For example, the SID library 106 may be a shared object library (.so) that is dynamically linked to the clients 104 at runtime.

The SID manager 102 may interact with the clients 104 to allocate blocks of SIDs and maintain SID data 108 describing these allocations. For example, for a particular client 104, which may have a client identifier 110 associated therewith, the SID data 108 may include an allocation 112 that lists those SIDs allocated to that client 104.

In some embodiments, as discussed below, each client 104 may periodically transmit its context mappings to the SID manager 102, such as by way of functions provided in the SID library 106. These context mappings maybe stored as context mappings 114 in the SID data 108 for that client 104. These context mappings 114 may be displayed to an administrator to enable monitoring of the state of the client 104. The context mappings 114 may also be used to restore the state of the client 104 in the event of failure of the client 104 or the computer system executing the clients 104. To that end, the context mappings 114 may be checkpointed and stored in persistent storage to enable restoration of the clients 104 to a checkpoint state in the event of failure or an instruction to rollback to a prior state. The clients 104 may provide their context mappings to the SID manager 102 and restore them from the context mappings 114 using functions of the SID library 106.

Each client 104 may likewise store its allocation 116 of SIDs and the context mappings 118 for each SID that has been associated with a context mapping. The management of SIDs allocated to a client 104, i.e. recording allocation of blocks of SIDs and the allocation of individual SIDs to a context mapping, may be performed by way of functions of the SID library 106.

The clients 104 may be coupled to one another by a dataplane 120. The SIDs may be used to route packets labeled with the SIDs among the clients 104 by way of the dataplane 120. The manner in which this is performed may be according to any approach known in the art, particularly IPv6. The dataplane 120 may further be coupled to a network 122 such that the SIDs are used to route packets to and from other computer systems by way of the network 122.

The methods disclosed herein describe the allocation of blocks of SIDs that is particularly useful for IPv6. However, the methods disclosed herein may also be applied to other circumstances in which allocations of values is required from a source to a plurality of clients such that each value is assigned to only one client and is unique to that client.

Figure 2:
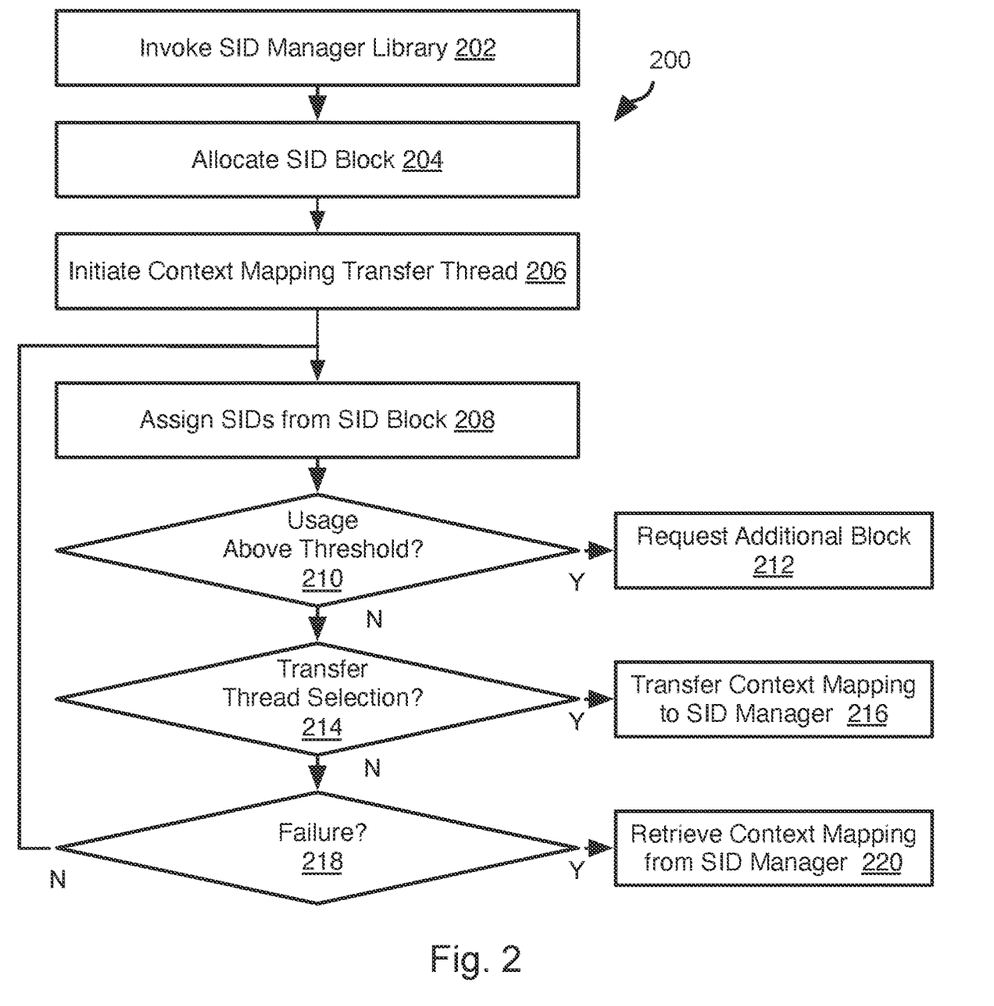
FIG. 2 is a process flow diagram of a method for managing assignment of SIDs in accordance with an embodiment of the present invention.

FIG. 2 illustrates a method 200 that be executed using the architecture 100. In particular, the method 200 may be executed for each client 104. The method 200 may include invoking 202 the SID library 106. In particular, a client 104 on startup may link to the SID manager library 106 and invoke a function, e.g., an initialization function. As a result of this function, the SID library 106 may instruct the SID manager 102 to allocated 204 a block of SIDs to the client 104. As noted above, the SID manager 102 ensures that all SIDs in the block of SIDs are globally unique relative to SIDs assigned to other clients 104. The allocation 204 of a block of SIDs may be performed automatically upon instantiation of a client 104 or may be performed in response to an explicit function call by the client 104 after startup, the function call being defined in the SID library 106.

The method 200 may further include initiating 206 a thread of execution defined in the SID library 106 within the process of the client 104, the thread performing the periodic transfer of context mappings 118 of the client 104 to the SID manager 102. The thread is preferably assigned a low priority so as not to interfere with other operations of the client 104. The thread may be woken up and executed according to either of (a) a fixed minimum period or (b) in response to loading of the computer system hosting the clients 104 falling below a specified level.

The method 200 may further include assigning 208, by the client 104, SIDs to context mappings. As noted above, this may include the client 104 associating a SID with a forwarding behavior that will be applied to packets labeled with that SID. This may be performed using library calls defined in the SID library. In particular, in some embodiments, the client 104 may not need to be aware or manage the block of SIDs, but rather request an SID similar to other approaches in the art. However, the SID that is provide to the client 104 is one that was previously allocated as a block to the client 104 and which is returned to the client 104 for use without needing to wait for a response from the SID manager 102.

The method 200 may further include evaluating usage of the block of SIDs allocated to the client 104. If the use is found to be above a threshold, e.g. more than 50 percent of the SIDs have been assigned to a context mapping, then the method 200 may include requesting 212 an additional block of SIDs from the SID manager 102. In this manner, there is never any latency with respect to assigning an individual SID since the supply of allocated SIDs will always be greater than zero. Note that steps 210 and 212 may be performed by functions of the SID library 106 and may be transparent to the client. In particular, in response to an assignment according to step 208, functions of the SID library 106 may perform the evaluation of step 210 and request 212 an additional block independent of any explicit request from the client 104 to do so.

The method 200 may include evaluating 214 whether the transfer thread from step 206 has been selected for execution, such as according to a thread manager of the operating system on the computer system or according to a thread manager implemented by the SID library 106. If so, then the method 200 may include transferring 216 the context mappings of the client to the SID manager 102. This may be performed automatically by the transfer thread directly reading the context mappings from a predefined location within the data of the client 104 and transferring the context mappings to the SID manager 102. Step 216 may include transferring only new context mappings since that last execution of the method 200. For example, SIDs may be associated with context mappings in numerical order such that only context mappings for SIDs higher than the highest SID reported in the last iteration of step 216 need be sent in a current iteration of step 216.

The method 200 may include evaluating 200 whether a failure has occurred 218. This may include detecting restarting of a client 104 due to the client 104 failing individually or the computer system hosting the clients 104 restarting after a failure. In response, the method 200 may include retrieving 220 the context mappings of the client 104 from the SID manager. This may be performed by the SID library 106. For example, upon instantiation of the client 104 due to restarting and the client 104 again linking to the SID library 106, the initialization function may evaluate whether the context mappings 118 of the client 104 match the context mappings 114 persistently stored by the SID manager 102. If not, the initialization function may retrieve 220 the context mappings 114 of the client from the SID manager 102 and set them as the context mapping 118.

Figure 3:
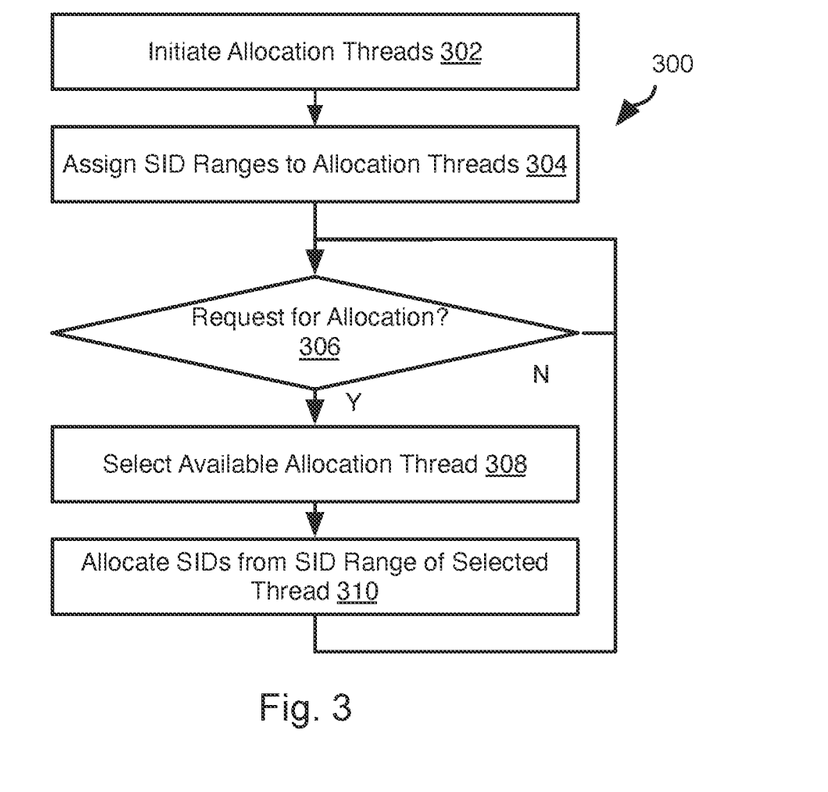
FIG. 3 is a process flow diagram of performing multi-threaded allocations in accordance with an embodiment of the present invention.

Referring to FIG. 3, the illustrated method 300 may be executed by the SID manager 102 when interfacing with the SID library 106 in order to allocated blocks of SIDs to clients 104. The method 300 may include initiating 302 a plurality, e.g. 2 to 10, of allocation threads. And assigning 304 ranges of SIDs to each thread, the range of SIDs assigned to a thread being different and non-overlapping with respect to the range of SIDs assigned to every other thread. Each range of SIDS may include a number of SIDs equal to many hundreds or thousands of blocks. Each allocation thread interfaces with the clients 104 by way of the functions of the library 106 to perform all functions relating to the range of SIDs assigned to it as described above. In particular, the allocation thread will allocate blocks of SIDs from its assigned range, receive reports of context mappings, maintain a persistent store of reports of context mappings, and restore context mappings from the persistent store upon failure as described herein.

When the SID manager 102 find 306 that a request for allocation of a block of SIDs has been received from a client 104, i.e. from a function of the library 106 executed in the context of a client 104, the SID manager 102 selects 308 one of the allocation thread, such as one that is idle (not currently performing another allocation or other function), or according to a round robin or other load balancing approach. The selected allocation thread then allocates 310 a block of SIDs to the client 104 from which the request was received, the block of SIDs being from the range of SIDs assigned to that allocation thread and being unique relative to other blocks assigned by that thread. The allocation to the client may be performed according to the methods described above in cooperation with the functions of the library 106.

Going forward, context mappings from the client that reference the SIDs from the allocated block will be handled by that allocation thread. For example, reports of context mappings that reference SIDs from the allocated block that are received from the client 104 will be routed to that allocation thread, which will then update the context mappings 114 for the SIDs referenced in the reports.

Figure 4:
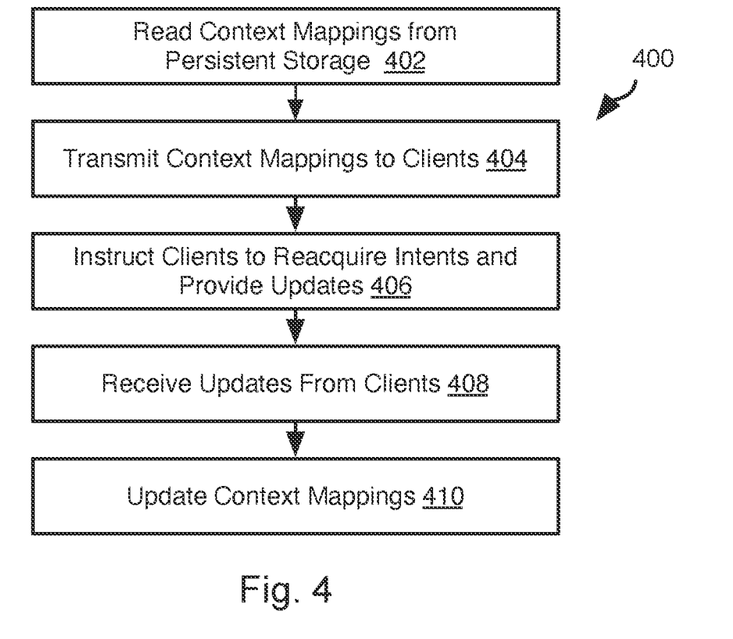
FIG. 4 is a process flow diagram of a method for restoring context mappings in accordance with an embodiment of the present invention.

Referring to FIG. 4, the illustrated method 400 may be executed by the storage manager 102 in cooperation with the clients 104 executing functions of the library 106 in order to restore the context mappings to the clients 104 from the context mappings 114 in the SID data 108. The method 400 may be executed in response to detecting a failure such as failure of the node executing the SID manager 102, failure of the SID manager 102, failure of one or more clients 104, or some other failure. The method 400 may be executed upon restoring to operation of the failed node or component (SID manager 102 or client 104).

The method 400 may include the SID manager 102 reading 402 the context mappings 104 from a persistent store, e.g. hard drive, flash drive, or other persistent storage device. The context mappings 114 associated with a particular client identifier 110 may be transmitted 404 to the client 104 assigned that client identifier 110.

The SID manager 102 may further instruct 406 the clients 104 to reacquire the context mappings from a source of such context mappings. In particular, a configuration file, configuration manager, or other source of network configuration data on the node execution the storage manager 102, a remote node to which it is connected by a network. The manner in which the clients 104 obtain configuration data to generate the context mappings may be according to any approach known in the art. The configuration data may change over time such that the context mappings 114 persistently stored by the storage manager 102 may be out of date or in accurate. The method 400 may therefore generate the instruction at step 406 in order to make sure that the clients 104 are current and that the context mappings 114 are updated.

The instruction from step 406 may further instruct the client 104 to provide updates to the storage manager 102, i.e. (a) any context mappings obtained from the source of configuration data that are not in the context mappings transmitted at step 404 and (b) any context mappings transmitted at step 404 but that are not defined in the context mappings obtained from the configuration data.

The clients 104 then perform these functions as instructed at step 406. Note that executing these instructions takes time, e.g. 10 seconds to several minutes. Accordingly, until the most current context mappings are obtained from the source of configuration data, the context mappings transmitted at step 404 may be received and used by the clients 104 in order to reduce downtime.

Each client 104 transmit the changes relative to the context mappings transmitted at step 404 and these updates are received 408 by the SID manager 102, which then updates 410 the context mappings 114 of that client 104 accordingly, i.e. adds new context mappings and/or removes context mappings that are no longer part of the context mappings for that client 104.

In some embodiments updating 410 of the context mappings may be performed by the SID manager 102 using a countdown timer and flags associated with context mappings 114 as described below. In particular, after step 402, and possibly after step 404, a countdown timer is started. The initial value of the countdown timer may be set equal to a value that corresponds to the amount of time required for the clients 104 to require their context mappings from the source of configuration data, e.g. greater than or equal to this amount of time. After step 402, all of the context mappings 114 that are read 402 from the persistent store are flagged as stale. At step 410, the stale flag is cleared for each context mapping 114 that matches a context mapping reported by one of the clients 104 at step 408. Steps 408 and 410 may be performed in an interleaved manner such that the stale flags are cleared as reports are received over a period of time. Step 410 may further include detecting expiration of the countdown timer, and, in response, identifying all context mappings 114 that are still marked as stale and deleting them from the SID data 108.

In the case of an individual client 104 failing, the client 104 may request transmission of its context mappings 114 mapped to its client identifier 110 upon restarting. The method may then continue at step 404 with respect to that client 104. Where multiple clients 104, the multiple clients 104 may restore their context mappings in the same manner as for an individual client.

Figure 5:
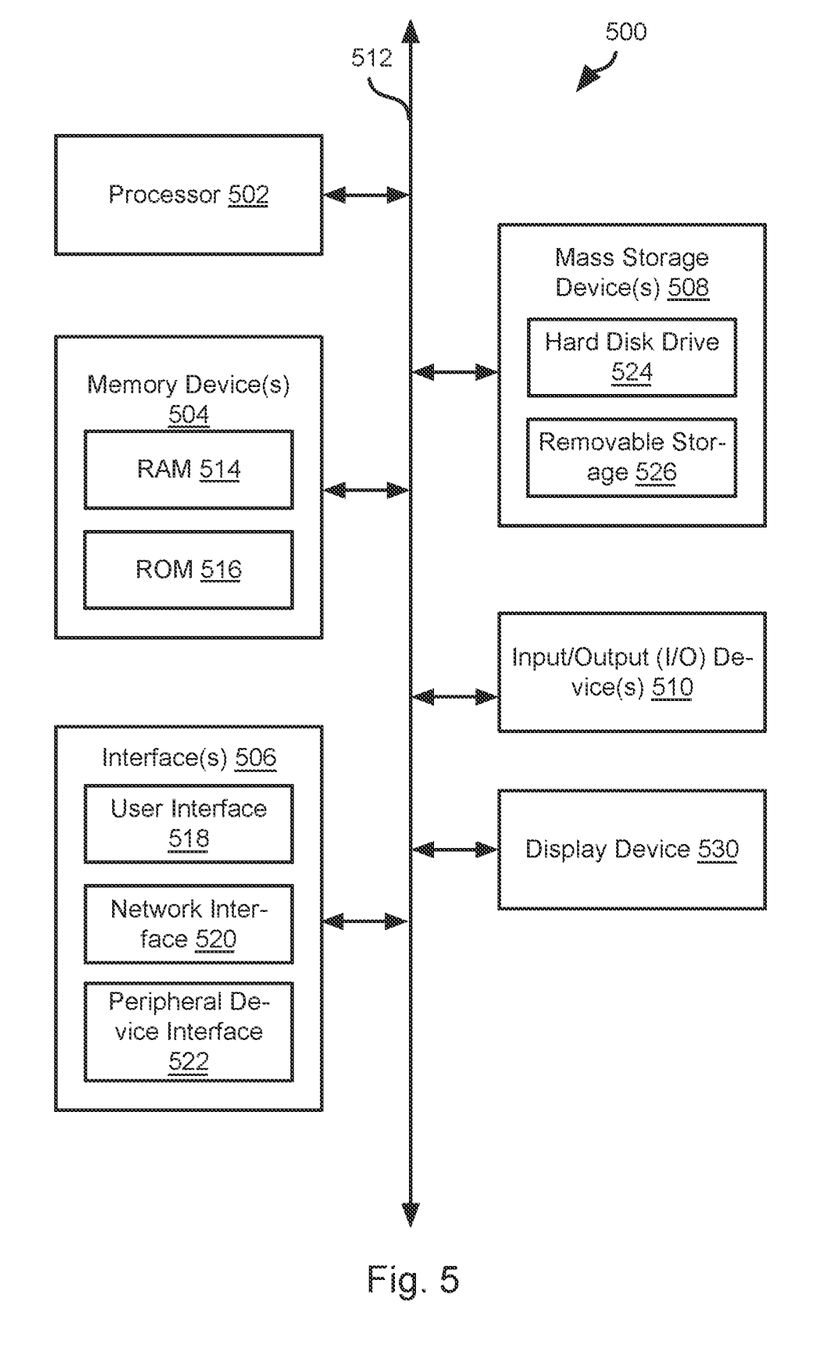
FIG. 5 is a schematic block diagram of a computer system suitable for implementing methods in accordance with embodiments of the present invention.

FIG. 5 is a block diagram illustrating an example computing device 500 which can be used to implement the system and methods disclosed herein. In particular, a node in a dataplane implementing the SID manager or any of the independent clients may have some or all of the attributes of the computing device 500.

Computing device 500 may be used to perform various procedures, such as those discussed herein. Computing device 500 can function as a server, a client, or any other computing entity. Computing device can perform various monitoring functions as discussed herein, and can execute one or more application programs, such as the application programs described herein. Computing device 500 can be any of a wide variety of computing devices, such as a desktop computer, a notebook computer, a server computer, a handheld computer, tablet computer and the like.

Computing device 500 includes one or more processor(s) 502, one or more memory device(s) 504, one or more interface(s) 506, one or more mass storage device(s) 508, one or more Input/Output (I/O) device(s) 510, and a display device 530 all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Display device 530 includes any type of device capable of displaying information to one or more users of computing device 500. Examples of display device 530 include a monitor, display terminal, video projection device, and the like.

Interface(s) 506 include various interfaces that allow computing device 500 to interact with other systems, devices, or computing environments. Example interface(s) 506 include any number of different network interfaces 520, such as interfaces to local area networks (LANs), wide area networks (WANs), wireless networks, and the Internet. Other interface(s) include user interface 518 and peripheral device interface 522. The interface(s) 506 may also include one or more user interface elements 518. The interface(s) 506 may also include one or more peripheral interfaces such as interfaces for printers, pointing devices (mice, track pad, etc.), keyboards, and the like.

Bus 512 allows processor(s) 502, memory device(s) 504, interface(s) 506, mass storage device(s) 508, and I/O device(s) 510 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The invention claimed is:

1. A system comprising:
a computing device including one or more processing devices and one or more memory devices operably coupled to the one or more processing devices storing executable code that, when executed by the one or more processing devices, causes the one or more processing devices to:
execute a plurality of client nodes implementing a network protocol;
implement a dataplane providing routing of data among the plurality of client nodes and an external network coupled to the computing device; and
implement a segment identifier (SID) manager programmed to:
for each client node of the plurality of client nodes, allocate a block of multiple SIDs to the each client node, the multiple SIDs being globally unique among all SIDs allocated to the plurality of client nodes; and
cause each client node of the plurality of client nodes to, for each individual SID of the block of SIDs, map a context of the each client node to the each individual SID, the allocating of the each individual SID being performed by the each client node independently from the SID manager.

2. The system of claim 1, wherein the context of the each client node is forwarding behavior associated with the each individual SID.

3. The system of claim 1, wherein the executable code, when executed by the one or more processing devices, further causes the one or more processing devices to cause each client node of the plurality of client nodes to, for each individual SID of the block of SIDs, map the context of the each client node to the each individual SID by:
invoking a first library function from a SID management library common to the plurality of client nodes.

4. The system of claim 3, wherein the executable code, when executed by the one or more processing devices, further causes the one or more processing devices to:
cause each client node of the plurality of client nodes to request the block of SIDs allocated to the each client node using a second library function from the SID management library.

5. The system of claim 1, wherein the executable code, when executed by the one or more processing devices, further causes the one or more processing devices to:
determine, by each client node of the plurality of client nodes, when (a) a threshold number of individual SIDs of the block of SIDs allocated to the each client node have been allocated to contexts of the each client node; and
in response to determining that (a) is true, request, by the each client node, an additional block of SIDs from the SID manager.

6. The system of claim 1, wherein the plurality of client nodes implement one or more of:
intermediate system to intermediate system (IS-IS) protocol;
open shortest path first (OSPF) protocol;
border gateway protocol (BGP); and
static routing.

7. The system of claim 1, wherein the plurality of client nodes implement Segment Routing over Internet Protocol Version 6 (SRv6) and use the SIDs of the blocks of SIDs according to SRv6.

8. A method comprising:
providing a plurality of client nodes executing on a computer system, the plurality of client nodes implementing a plurality of network protocols;
implementing, on the computer system, a dataplane providing routing of data among the plurality of client nodes and an external network coupled to the computer system;
receiving, by a segment identifier (SID) manager executing on the computer systems, requests for SIDs from the plurality of client nodes; and
for each client node of the plurality of client nodes, allocating, by the SID manager, a block of multiple SIDs to the each client node in response to a requests of the requests received from the each client node, the multiple SIDs being globally unique among all SIDs allocated to the plurality of client nodes.

9. The method of claim 8, further comprising:
mapping, by each client node of the plurality of client nodes, each individual SID of the block of SIDs allocated to the each client node, a context of the each client node to the each individual SID, the allocating of the each individual SID being performed by each client node independently from the SID manager.

10. The method of claim 9, wherein the context of the each client node is forwarding behavior associated with the each individual SID.

11. The method of claim 9, further comprising, for each individual SID of the block of SIDs, map the context of the each client node to the each individual SID by:
invoking a first library function from a SID management library common to the plurality of client nodes to map the each individual SID to the context of the each client node.

12. The method of claim 11, further comprising:
requesting, by each client node of the plurality of client nodes, the block of SIDs allocated to the each client node using a second library function from the SID management library.

13. The method of claim 9, further comprising:
determining, by each client node of the plurality of client nodes, when (a) a threshold number of individual SIDs of the block of SIDs allocated to the each client node have been allocated to contexts of the each client node; and
in response to determining that (a) is true, requesting, by the each client node, an additional block of SIDs from the SID manager.

14. The method of claim 8, wherein the plurality of client nodes implement one or more of:
intermediate system to intermediate system (IS-IS) protocol;
open shortest path first (OSPF) protocol;
border gateway protocol (BGP); and
static routing.

15. The method of claim 8, wherein the plurality of client nodes implement Segment Routing over Internet Protocol Version 6 (SRv6) and use the SIDs of the blocks of SIDs according to SRv6.

16. A system comprising:
a computing device including one or more processing devices and one or more memory devices operably coupled to the one or more processing devices storing executable code that, when executed by the one or more processing devices, causes the one or more processing devices to:
receive, over a network, a block of segment identifiers (SIDs) from a SID manager, the block of SIDs including at least 100 SIDs and being globally unique among clients of the SID manager; and
(a) associating a context mapping with each SID of the block of SIDs independent from the SID manager, the context mapping for each SID including both each SID and a forwarding behavior.

17. The system of claim 16, wherein the executable code, when executed by the one or more processing devices, causes the one or more processing devices to:
labeling a packet with a first SID of the block of SIDs such that the packet will be routed according to the forwarding behavior of the context mapping associated with the first SID at (a).

18. The system of claim 16, wherein the executable code, when executed by the one or more processing devices, causes the one or more processing devices to implement one or more of:
intermediate system to intermediate system (IS-IS) protocol;
open shortest path first (OSPF) protocol;
border gateway protocol (BGP); and
static routing.

* * * * *